Dec. 16, 1958

R. L. PERKINS 2,864,892

TRANSDUCER MOUNTING

Filed April 7, 1954

INVENTOR
*Robert L. Perkins*

BY *Cushman, Darby & Cushman*
ATTORNEYS

Dec. 16, 1958  R. L. PERKINS  2,864,892
TRANSDUCER MOUNTING
Filed April 7, 1954  3 Sheets-Sheet 2

INVENTOR
Robert L. Perkins
BY
Cushman, Darby & Cushman
ATTORNEYS

INVENTOR
Robert L. Perkins

United States Patent Office 2,864,892
Patented Dec. 16, 1958

2,864,892

TRANSDUCER MOUNTING

Robert L. Perkins, St. Paul, Minn., assignor, by mesne assignments, to Sperry Rand Corporation, a corporation of Delaware Application April 7, 1954, Serial No. 421,573

25 Claims. (Cl. 179—100.2)

This invention pertains to adjustable mountings for transducers adapted for recording on and reading and erasing from a record member which is relatively movable with respect to the transducer so that the transducer sweeps out tracks or paths over the surface of the record member.

A relationship between transducers and moving records is found, for example, in the art of so-called magnetic recording, and in the art of recording wherein the transducing operation includes exposing a source of variable light to a light sensitive surface. While the description of the present invention will proceed mainly with reference to magnetic transducing, the scope of the invention is not intended to be limited to such recording, in view of the wider application. The generic aspects of the invention are best exemplified by the positioning of magnetic transducers or "heads" mounted in a shroud encasing a high-speed rotatable drum. However, reference thereto in detail is made below only to clarify the description of the invention.

In United States Patent 2,617,705, granted November 11, 1952, to J. M. Coombs et al. and assigned to the assignee of the present application, there is described apparatus for recording magnetic spots or cells on the surface of an elongated magnetizable member which is adapted to be moved continuously in relation to various magnetic transducing heads. The transducing heads in Patent 2,617,705 are shown as relatively large ring-shaped structures. A more advanced embodiment of head structure is shown in Figures 2 and 3 of Patent 2,660,622, granted to W. J. Field et al. on November 24, 1953, and assigned to the assignee of the present application. In the particular embodiment disclosed in Patent 2,617,705 it is explained how so-called binary magnetic spots, that is, spots or cells having remnant flux oriented in one of two possible directions, may be recorded upon and played-back from the magnetizable surface of a revolving drum by means of a plurality of the magnetic transducers positioned adjacent to but preferably out of contact therewith. The clearance between the transducer recording gap and the drum periphery as stated may be of the order of 0.002 inch. As the drum rotates each transducer scans a path or track around the drum.

Since there may be as many as several hundred magnetic transducer heads associated with a single drum, it is highly desirable, if not mandatory, to provide some means for adjusting the position of the transducer with respect to the drum after the drum is assembled in its shroud. Because the strength of a signal varies roughly as the square of the distance between the transducer and the recording medium (be it magnetic or otherwise) both in the writing and again in the playback operation, very small deviations in head-to-drum clearance can result in serious difficulties. Even if perfect clearance could be established in manufacture, unavoidable irregularities in the operational characteristics of individual heads make adjustment after assembly almost essential.

Ordinarily each track on the drum is supplied with one dual-purpose transducer for both recording and playback operations. However, where two or more transducing heads are associated with a single track, it is usually essential that they be precisely located with respect to each other. For instance, a playback head must be positioned squarely over a given magnetic spot at the instant playback of that spot is required in order to assure correct reproduction of the stored information. The use of a track on the drum as a data revolver or as a delay line requires separate recording and playback heads. As a data revolver, a series of signals are recorded on the track and fed back to the recording head via a playback head mounted along the same track. This requires that the recording and playback heads be separated by an integral number of cell spaces, less a short distance to allow for inherent delays in reading and recording. By providing an alternate feedback through a second playback head, the drum may serve as a shifting register. Each time the information is recirculated through the second playback head rather than the first, its phase will be altered if the ratio of the spacing between playback heads to that between the recording and first playback heads is not an integer. For such uses, either the shroud must be manufactured with very close precision or all but one of the interrelated heads must be tangentially or circumferentially adjustable.

In certain instances it is desirable to provide a transducing head which is adjustable axially with respect to the drum, as where a transducing head is required to be associated with different tracks according to the intended operational use of the drum. As the present description proceeds, it will be apparent that according to the invention, transducers may be made adjustable axially of the drum equally as well as tangentially or circumferentially thereto. The present invention includes arrangements for rendering a given transducing head adjustable in three dimensions.

As hereinabove indicated, in accordance with the present invention a transducer mounting may be provided which may be used to mount transducing heads for use not only with drums, but with magnetizable, light sensitive, etc. discs, tapes or wires. In all cases a "radial" adjustment may be provided for fixing the head-to-record clearance and a "tangential" or lateral adjustment for fixing the position of the transducer with respect to a surface related to the path in which the tape or wire moves. In most instances free-running magnetic tapes and wires are moved in contact with the transducer so that only the lateral feature of the invention would be required.

Where a rotating disc is employed as the record member, two adjustments may be required, one to establish the head-to-disc spacing and the other to center the head on a particular track, especially where two or more heads are used on the same track. Cross-track adjustment also may be desirable in tape and drum applications to allow a head to be moved from track to track.

Briefly stated, the invention basically provides a means for adjustably mounting a transducing device for movement with respect to the path of travel of a record member. It is contemplated that a main support means, such as a drum shroud, will be provided with a surface formed by or thereon or therein having a predetermined configuration which is related to the path of travel of the record. For example, the surface may be a machined surface concentric with a drum surface, or the surface may be a machined flat or plane surface. The transducer device mounting means includes a transducer support member which has surfaces bearing or sliding on the just mentioned surface formed in predetermined configuration related to the path of travel of the record member. Finally, there is provided means acting between the main support means and the transducer support member for permitting movement of the support member along the said surface of the main support means, the interacting means being arranged to continuously exert a force on the transducer support to maintain said bearing relationship.

Accordingly, a primary and general object of this invention is to provide a mounting for a transducing device which is adjustable both in normal and lateral including tangential directions with respect to a record member.

A further object of this invention is to provide a mounting for a transducing device which is adjustable radially, tangentially, circumferentially and/or axially with respect to a rotating record drum.

Another object of the invention is to provide a transducer mounting which is adjustable in a lateral direction with respect to a magnetizable record member which moves in contact with the transducer.

A further object of this invention is to provide a transducer mounting which is rigidly adjustable both in a direction normal to the surface of the record member and longitudinally, transversely or both with respect to the direction of movement of the record member.

A still further object of this invention is to provide a magnetic drum transducer head mounting which is rigidly adjustable both radially and tangentially or circumferentially.

Another object is to provide a transducer mounting which is adjustable both in a direction normal to the surface of a drum, disc or tape record member and transverse to its direction of motion.

A further object is to provide a longitudinally adjustable transducer head mounting for use with magnetic wire or tape.

Another object is to provide, for use with magnetic tape or wire, a transducer head mounting that is adjustable both longitudinally and in a direction normal to the surface of the tape or wire.

Further objects and the entire scope of the invention will become further apparent as this description proceeds.

Exemplary embodiments of the invention may be best understood with reference to the accompanying drawings, wherein.

Figure 5:
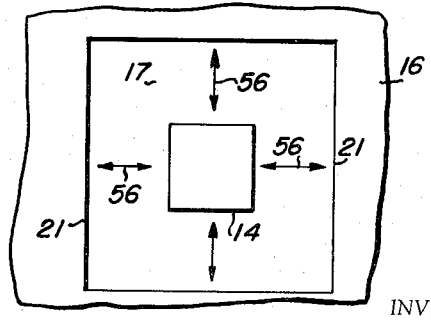

Figure 5 diagrammatically illustrates an arrangement for moving the transducing head in all directions on a bearing surface formed in the main support means for the transducing device.

Figure 6:
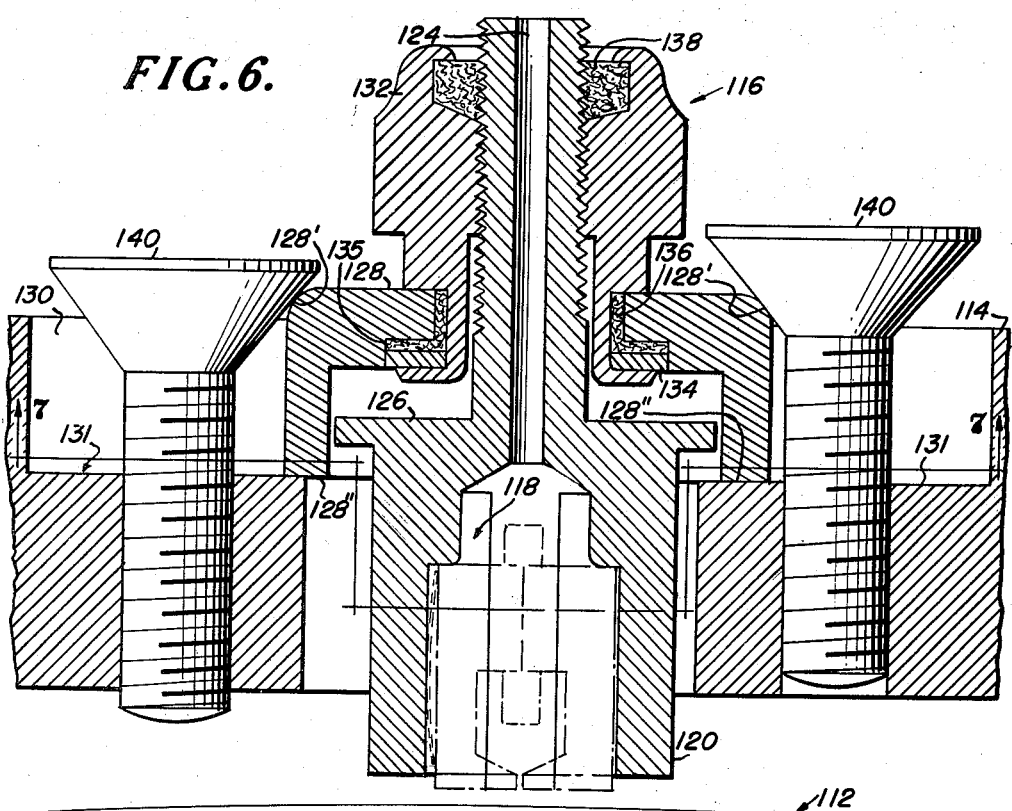

Figure 6 shows an elevational view in cross-section of a further embodiment of a transducer mounting device according to the invention.

Figure 8:
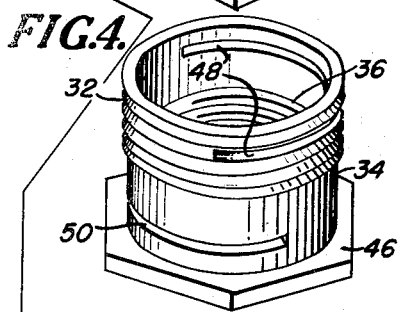
Figure 8:
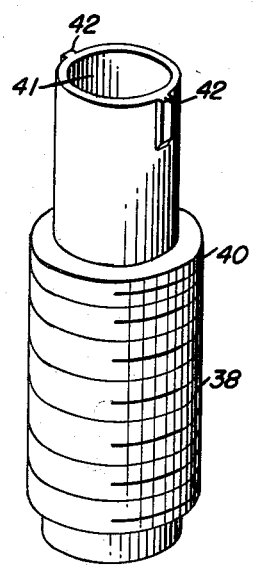
Figure 8:
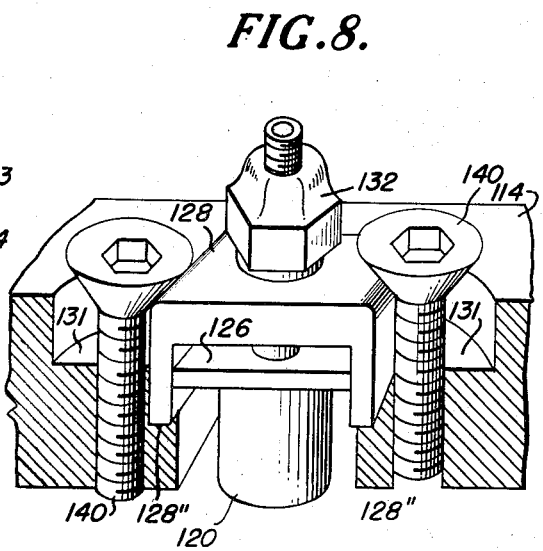
Figure 7:
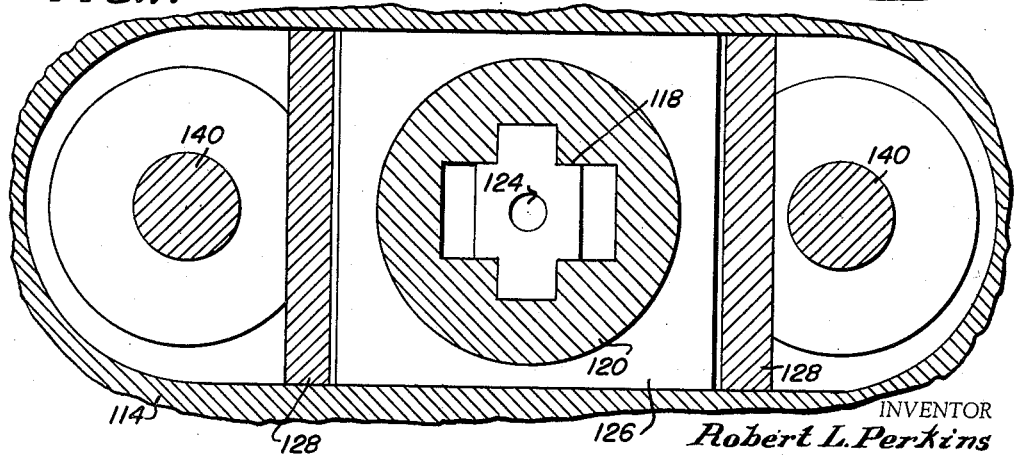

Figure 7 shows a plan view partly in section of the structure shown in Figure 6, taken along the line 7—7 of Figure 6, and Figure 8 shows a perspective view of the assembly of Figure 6, partly in section.

Figure 1:
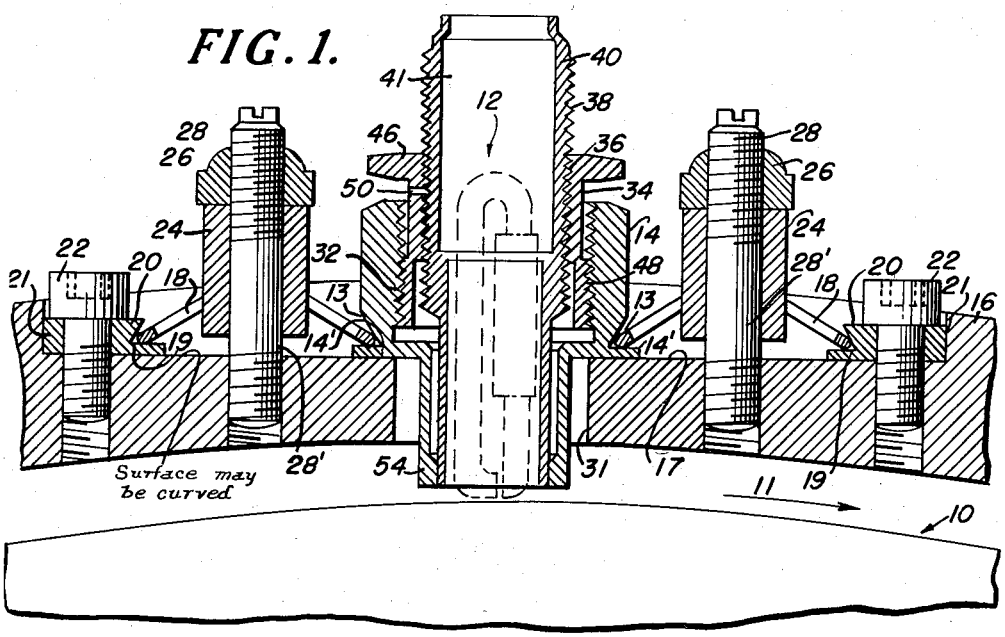
Figure 1 shows a cross-sectional view in elevation of a first embodiment of a transducer mounting assembly for providing tangential and radial adjustment with respect to the surface of a magnetic drum.
Figure 2:
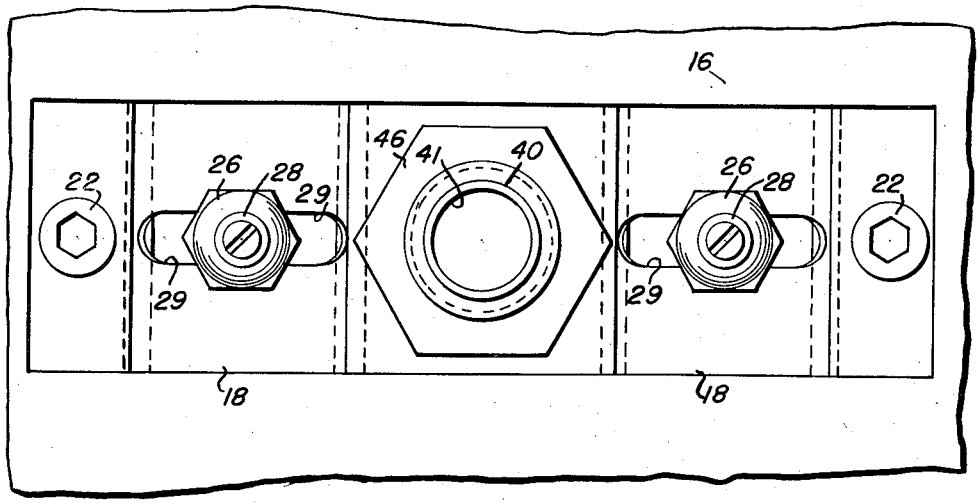
Figure 2 shows a top plan view of the structure of Figure 1.
Figure 4:
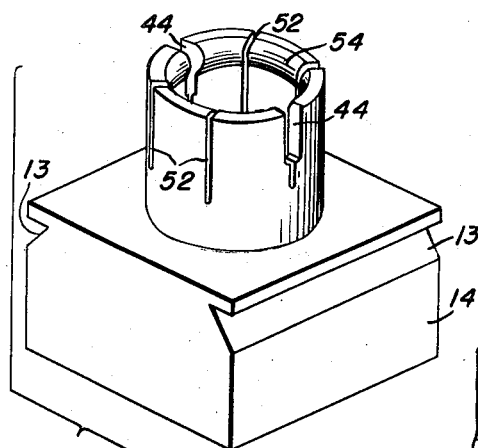
Figure 4 shows an exploded view of a portion of structure shown in Figures 1 and 2 by use of which radial adjustment is provided.

Referring now to Figure 1, a representative record member is shown as the surface 10 of a magnetic drum which is moved in the direction indicated by arrow 11 (or opposite thereto) past a mounting for a magnetic transducer head designated generally as 12, which mounting may be rigidly adjusted with respect to said surface. A transducer support is provided in the form of a head insert 14, in which a magnetic core or other transducing device may be mounted. This insert is slidably positioned over an opening in the shroud 16 which encloses the drum and provides a main support means for the transducer. (A magnetic transducing device is shown in chain line.) That portion of the head insert 14 which is next to the drum surface is cylindrical in cross-section, while the portion protruding above the opening is rectangular, all as is clearly shown in Figure 4. The magnetic head insert 14 is held firmly in bearing relation against the shroud 16, which is machined to a surface 17 over the area occupied by the mounting, this surface having a predetermined relationship with the path of travel of the record member. In Figure 1, surface 17 is a plane. However, this surface may have other configuration, as will become apparent. A face portion 14' of insert 14 is maintained against surface 17 by slotted angle-pieces 18 socketed in V-shaped grooves 13 on both sides of the insert 14. The other end of each angle-piece 18 is socketed in a V-groove 19 cut in a jamb 20 which is fastened to the shroud 16 by a screw 22. Additional rigidity may be given to the jambs 20 if the shroud is slotted to house the mounting by butting them against the end walls 21 of the slot thus formed. Downward pressure is transmitted to each arched angle-piece 18 through a T pad 24 by turning lock-nut 26 in engagement with a stud 28, the latter being threaded at both ends. Initially the stud 28 is turned into a threaded hole in the shroud 16 until its unthreaded central portion 28' jams the hole. This prevents the stud 28 from rotating with the lock-nut 26.

Figure 3:
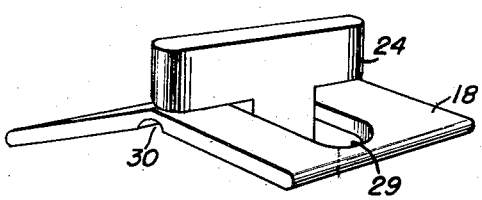
Figure 3 shows a perspective view of an angle piece and T pad included in the structure shown in Figures 1 and 2.

As shown in perspective in Figure 3, each angle-piece 18 has a longitudinal slot 29 to provide clearance for the T pad 24 and stud 28. Each angle-piece 18 also has a circular indentation or groove on the under side of its apex to form a narrow neck 30 which should be narrow enough to localize all or most of the bending action at the neck and to withstand considerable flexing without fracture. In a preferred example, angle-pieces 0.0625 inch thick (16 gauge annealed steel) with a neck 0.03 inch thick have proved satisfactory. It is desirable, when forming the neck 30, to machine the groove to leave the direction of tool marks parallel to the slot 29 or else to form it by stamping. Tool marks normal to the slot 29 may eventually initiate progressive failure.

Once the mounting is assembled, the head may be shifted tangentially by alternately loosening one lock-nut 26 and tightening the other. In this manner, the head is displaced in a direction away from the angle-piece 18 being depressed, the range of motion being limited by contact of the lower edge of the T pad 24 with the shroud 16. By way of example, in a head assembly having an overall length of less than four inches, the head may be "walked" a distance of 0.05 inch in either direction from a central position. An aperture 31 is provided larger than the part of insert 14 passing therethrough to permit said walking. Since magnetic cells are generally spaced at least as close as 80 to the inch, the head will be adjustable over at least four cells in either direction from a central position. It will be appreciated that the head is adjustable over a far greater range than is necessary to allow for reasonable manufacturing tolerance. No great difficulty is encountered in fabricating a shroud which will allow the playback head to be positioned at any of six or seven different specified numbers of cell spaces from a fixed recording head. This allows a certain amount of flexibility in the use of a particular drum. This flexibility is particularly useful in an alternate feedback type of data revolver in which the phase of a message being recirculated through a first playback head is altered by recirculating it through a second playback head. The change in phase introduced by the alternative path is dependent on the ratio of the number of cell spaces between the record head and the two playback heads. For instance, if the first playback is 200 cell spaces from the recording head and the second is 425, the message could be recirculated in eight phases, but if the second playback were 430 cell spaces from the recording head, the message would have twenty phases.

It should be noted here that the transducer mounting being described ideally should provide circumferential rather than tangential adjustment. If required, circumferential adjustment can be readily attained by simply making the surface 17 of shroud 16 and the mating surface 14' of the head insert 14 cylindrical rather than flat, to be concentric with the drum. Such configuration is suggested by legend in Figure 1. This modification ordinarily is not required inasmuch as the tangential movement is small compared to curvature of the drum. Where practical, the tangential adjustment is preferred for reasons of economy in manufacture.

Radial adjustment is accomplished by means of a differential thread arrangement which enables the head to be sensitively positioned with respect to the magnetic drum surface 10. As shown in the exploded view of Figure 4, the shell structure carrying the core comprises three co-acting members. The rectangular portion of the head insert 14 contains a hole threaded to fit external thread 32 on a differential adjustment nut 34. The threads 32 extend over approximately the lower half of the nut 34. The nut 34 is also provided with inner threads 36 extending over the remaining half of its length. The threads 36 coact with external threads 38 of a hollow cylinder 40, the cavity 41 of which may house a magnetic core. The cylinder 40 is provided with key flanges 42 which engage keyways 44 in the cylindrical portion of the insert 14 to prevent the cylinder from rotating while allowing it to move axially. The insert 14 is in turn held rigidly in place by the angle-pieces 18. By providing the external threads 32 with a slightly different pitch than that of internal threads 36, the cylinder 40 advances or retracts in a vernier sense as the hexagonal head 46 of the nut 34 is rotated.

In a specific embodiment, the threads 32 may run at 20 threads to the inch and the threads 36 at 24 to the inch, both having a right-hand thread. Then, if the differential nut 34 is rotated one full clockwise turn, it will advance 0.05 inch while the cylinder 40 retracts about 0.042 inch with respect to the nut 34. The resultant forward movement of the cylinder is 0.008 inch, allowing the magnetic core contained in the cylinder to be sensitively positioned with respect to the recording surface.

The sleeve of differential adjustment nut 34 is provided with a pair of elongated slits such that slit 48 intersects only the external threads 32 and slit 50 intersects threads 36. The differential nut 34, as a result of these slits, is effectively divided into a series of three arms. The arms are permanently deformed by bending to provide an interference resilient fit with their mating thread surfaces. In so doing, all backlash or thread clearance is eliminated, and a rigid, zero-clearance radial adjustment is obtained.

The cylindrical portion of magnetic head insert 14 is divided into several resilient segments or fingers by four longitudinal cuts 52 and the two keyways 44. At the extreme end of each finger is an integral securing tip 54. The securing tips 54 engage the cylinder 40 to provide a resilient but zero-clearance fit between the fingers and the cylinder 40. In supporting the cylinder 40 by the securing tips 54, the cylinder is free of contact with the inside surface of the insert 14, and any non-concentric location of the magnetic core within the cylinder 40 due to eccentricities between the internal and external threads of differential nut 34 is thereby reduced.

It will be appreciated that the means for producing tangential adjustment is equally applicable to any transducer regardless of whether any means is provided for radial adjustment or whether the transducer is magnetic or non-magnetic in operation. The device described above is equally applicable to disc, tape or wire recording means, although when tape or wire is used, radial adjustment is not ordinarily required. Although it has been described in relation to magnetic recording on the surface of a rotating drum, many modifications and variations are possible without departing from the spirit and scope of the invention described and illustrated.

It is thought to be apparent that if additional arched angle-pieces 18 be arranged to bear against the remaining two sides of the insert 14, the transducer may be moved in all directions on the surface 17. Figure 5 diagrammatically shows this type of arrangement, the arrows 56 representing forces applied by member 18. It will be appreciated that by having the length of members 18 along grooves 13 less than the length of these grooves, conflict of the members at the corners can be avoided.

A second embodiment of the invention will now be described with reference to Figures 6–8, wherein a representative record member is shown as a magnetic drum having a magnetizable surface 112 which rotates within a shroud 114 on which magnetic transducer head mountings such as that indicated generally as 116 may be maintained. Housing for a magnetic head is provided by a cross-shaped cavity 118 in a body 120 which is preferably constructed of copper for shielding purposes. One pair of diametrically opposite channels of the cavity 118 houses the magnetic transducer core while the other pair provides clearance for the winding. The transducer head (outlined in chain line) may be held firmly in place by means of a non-conductive potting compound such as casting resin. A hole 124 is drilled axially through the body 120 for passage of lead wires (not shown) to the head.

The body 120 has a rectangular portion 126 which fits into a U-shaped mounting bracket 128, the latter serving as a supporting member for the transducer. Both the rectangular section 126 and bracket 128 are intimately fitted into a slot 130 in the shroud 114. This slot is shown running in a direction tangential to the drum surface 112, although other directions are possible. Slot 130 is provided with a base surface 131 which meets the specification set forth hereinabove for surface 17 of Figures 1–5. The ends 128" of the bracket 128 serve as face portions for bearing on the base surface 131.

The upper portion of the body 120 is threaded to fit a self-locking nut 132. The nut 132 is swaged around a spring steel washer 134 to hold it tight against the mounting bracket 128, into a cylindrical recess 135 in which the washer 134 fits. An oversize L-shaped nylon ferrule 136 is used to provide clearance take-up and to allow a pressure fit between the stop nut 132 and the bracket 128 without undue friction or failure of metal to metal contacts which would possibly result from frequent adjustments. In one application, the nut 132 provides zero-clearance fit with the threads of the body 120 by a nylon locking ring 138, familiar to the art. When the nut 132 is rotated, the body 120 is prevented from rotating by the rectangular plate 126 and so is moved in a direction normal to the drum surface 112.

To accomplish tangential adjustment, the upper corners 128' of the ends of the mounting bracket 128 are rounded. A bevel head screw 140 is mounted in the shroud 114 beyond each end of the bracket 128 in such a manner that the bevel or conical underside of its head rides on the curved portion of the bracket. It is thought to be now apparent that by alternately loosening and tightening the two screws 140, the transducer support can be "walked" in a direction tangential to the drum surface 110. The screws are inherently cocked when tightened, thereby producing an interference resilient fit with their mating thread surfaces which takes up any backlash or thread clearance. This locks the mounting firmly in position until subsequent adjustment is required.

It is thought to be now apparent that the adjustment may be made circumferential instead of tangential by making the base surface 131 of the slot 130 concentrically cylindrical with the drum. Ideally, the mating surface of the mounting bracket 128 would have the same curvature, but this would probably be unnecessary. Axial, instead of tangential, adjustment can be obtained by running the slot in an axial direction. By use of four screws 140, one on each side of bracket 128, movement in all directions on surface 131 is possible, according to the principle set forth in Figure 5.

It will be appreciated that this same mounting is equally applicable for use with non-magnetic transducers. The interior of the head barrel may be reformed as necessary, with an increase in size of part or all of the assembly as required. These same changes would be required according to the type of magnetic head being mounted. For instance, the magnetic head depicted in Figures 2 and 3 of United States Patent 2,660,622, issued November 24, 1953, to William J. Field, et al., would require one relatively large cylindrical recess with a single notch.

The mounting described above and shown in Figures 6-8 readily lends itself to miniaturization. This embodiment of the invention has been constructed so that two such assemblies can be mounted along the same track of the drum with the centers of the heads separated by less than ⅞ of an inch. By using a common screw between the two assemblies, this spacing can be reduced to about 9/16 of an inch, but this results in the two heads not being independently adjustable. Even with such miniature proportions, the mounting provides a tangential adjustment of .03 inch. In magnetic drums with which this invention is particularly designed to cooperate, magnetic spots are generally spaced at least as close as 80 to the inch, as hereinabove mentioned. Therefore, the miniaturized version of this invention may travel over 2.4 cell spaces. It will be appreciated that the shroud can be readily fabricated to allow a minature head to be adjustably positioned at precisely its required location.

Although the just described embodiment of invention has been illustrated with reference to a record drum, it is susceptible to various modifications for application to magnetic or non-magnetic recording on wires, tapes or discs without departing from the inventive concept.

The foregoing detailed descriptions have been made only for purposes of illustration, and the scope of the invention is to be determined from the appended claims.

What is claimed is:

1. Apparatus for adjustably mounting a transducing device for movement with respect to the path of travel of a record member including, a main support means having a surface formed in a predetermined configuration related to said path of travel of said record member, a transducer support member disposed in a bearing relation on said surface of said main support means, and means at least in part angulated as to both the main support means and said transducer support member for producing one force component for moving the transducer support member along said surface and for producing a second force component for maintaining said support member in said bearing relation to said surface.

2. Apparatus as in claim 1 wherein the means angulated at least in part includes adjustment means protruding normal to said surface to be accessible above said surface.

3. Apparatus as in claim 1 wherein the path of travel of the record member is a plane and wherein said surface of the main support means is in a parallel plane.

4. Apparatus as in claim 1 wherein the path of travel of the record member is a curved surface and wherein the surface of the main support means is equi-distant from said curved surface at all points thereof.

5. Apparatus as in claim 1 wherein the path of travel of the record member is cylindrical and wherein said surface of the main support means is concentrically cylindrical thereto.

6. Apparatus as in claim 1 wherein the path of travel of the record member is a curved surface and wherein said surface of the main support means is a plane.

7. Apparatus as in claim 1 wherein the means angulated at least in part includes opposed members operatively bearing on said support member one toward the other and each toward said surface.

8. Apparatus as in claim 7 wherein each opposed member includes arched means having one end socketed in the main support means and the other end socketed in said transducer support member with the crest of the arch away from said surface, and means supported by said main support means and movable toward and away from said surface for restraining the crest of the arch to thereby determine the spread of the arched means between the socket points.

9. Apparatus as in claim 7 wherein the opposed members include screw-thread members mounted in threaded apertures in the main support means, each screw-threaded member having a head having a bevelled surface engaging said support member for exerting forces thereon one toward the other and each toward said surface of the main support means.

10. Apparatus as in claim 1 wherein the transducer support means includes means for adjustably moving the transducing device inwardly and outwardly in a direction substantially normal to said surface of the main support means.

11. Apparatus as in claim 1 wherein the means angulated at least in part includes means for moving the transducer support member over the surface of the main support means in both directions along a single path.

12. Apparatus as in claim 11 wherein said single path is parallel to the direction of motion of the surface of the record member.

13. Apparatus as in claim 11 wherein said single path is transverse to the direction of motion of the record member.

14. Apparatus as in claim 1 wherein the means angulated at least in part includes means for moving the member in all directions over said surface of the main support means.

15. Apparatus for adjustably mounting a magnetic transducing device for movement with respect to the path of travel of the magnetizable surface of a cylindrical drum, the apparatus including, a main support means comprising a shroud about at least a portion of the drum, a surface machined in the drum shroud in a plane normal to a line extending radially of the drum and parallel to the axis of the drum, an aperture in the shroud through said surface, a transducer support member having a face portion bearing on said surface surrounding said aperture in the shroud, an aperture centrally of the transducer support member and extending therethrough from end to end for receiving a magnetic transducer core, a socket groove along edges of said transducer support member above said surface of the support member which bears on said surface of the shroud, jamb means mounted on the shroud to either side of the socket grooves in said transducer support member, two arched angle members extending between said socket groove in said transducer support member and said jamb one to either side of the transducer support member, the angle member being arched away from said surface, T pad members, and means extending from said surface of said shroud for engaging and adjustably compressing the respective arched members toward said surface between said jambs and said socket grooves of said transducer support member to exert opposed forces and forces on said transducer support member in the direction of said surface of said shroud to maintain the transducer support member in said bearing relation with said shroud surface while permitting the support member to be adjustably walked over said surface of the shroud, a portion of said transducer support member extending through said aperture in the shroud, the aperture being larger than said part of the support member extending therethrough to permit said walking of the support member within predetermined limits.

16. Apparatus for adjustably mounting a magnetic transducing device for movement with respect to the path of travel of the magnetizable surface of a drum, said apparatus including, a main support means comprising a drum shroud having a surface machined therein in a plane normal to a line radially extending from the drum and parallel to the axis of the drum, an aperture through said shroud in said surface, a transducer support member having a face portion disposed in a bearing relation on said surface, a portion of the transducer support member extending through said aperture and being of lesser cross-section than said aperture to permit movement of the transducer support member within the confines of said aperture, screw-threaded members extending from screw-threaded apertures in said shroud and located to either side of said aperture, the screw-threaded members each having a head having a bevelled underside operatively positioned to place the support member under opposed forces and under forces directed toward said surface in said shroud to cause the transducer support member to be retained in said bearing relation on said surface, the arrangement being such that by altering the relative positions of the screw-threaded members the transducer support member may be walked over said surface within the confines of said aperture through which said portion of the magnetic transducer support member extends.

17. Apparatus for adjustably mounting a magnetic transducing device for movement with respect to the path of travel of the magnetizable surface of a drum, said apparatus including, a main support means comprising a drum shroud having a surface machined therein in a plane normal to a line radially extending from the drum and parallel to the axis of the drum, an aperture through said shroud in said surface, a transducer support member having a face portion disposed in a bearing relation on said surface, a portion of the transducer support member extending through said aperture and being of lesser cross-section than said aperture to permit movement of the transducer support member within the confines of said aperture, screw-threaded members extending from screw-threaded apertures in said shroud and located to either side of said aperture, the screw-threaded members each having a head having a bevelled underside positioned to engage opposed sides of said transducer support member to place the support member under opposed forces and under forces directed toward said surface in said shroud to cause the transducer support member to be retained in said bearing relation on said surface, said transducer support member including a U-shaped bracket the ends of which form said face portions and bear on said surface in said shroud, and the corners whereat the sides of the bracket are joined by a cross member engage said bevelled surfaces of said screw-threaded members, the arrangement being such that by altering the relative positions of the screw-threaded members the transducer support member may be walked over said surface within the confines of said aperture through which said portion of the magnetic transducer support member extends.

18. Apparatus as in claim 17 wherein the transducer support member further includes a transducer support body having a portion for engaging said bracket to prevent rotation between said body and bracket, and further includes screw-threaded means rotatably mounted on said bracket for engaging screw-threads on said body for adjusting the position of the body with respect to said bracket and therefore with respect to said surface in said shroud in a direction normal to said surface.

19. Apparatus for adjustably mounting a transducing device including a transducer support member comprising a bracket and a transducer housing, an aperture in said bracket, a portion of the transducer housing being threaded and extending through said aperture, a threaded nut in threaded engagement with said threaded portion of said housing, a portion of the nut extending through said aperture, a shoulder on the nut engaging one side of said bracket about said aperture, a swaged-over portion of the nut extending over a portion of the opposite side of the bracket about said aperture, and a nylon member having at least a portion thereof disposed between said swaged-over portion of the nut and said opposite side of the bracket.

20. Apparatus as in claim 19 wherein a portion of the nylon member surrounds the portion of the nut which extends through the aperture, the just mentioned portion of the nylon member being in contact with the said extending portion of the nut and the wall defining the aperture.

21. Apparatus as in claim 20 wherein the nylon member is a ferrule of L-shaped longitudinal cross-section, the base of the L being the first mentioned portion between the swaged-over portion of the nut and the bracket, and the side of the L being the portion surrounding the extending portion of the nut.

22. Apparatus as in claim 19 and further including a washer between the swaged-over portion of the nut and said nylon member.

23. Apparatus as in claim 20 and further including a washer between the swaged-over portion of the nut and said nylon member.

24. Apparatus as in claim 21 and further including a washer between the swaged-over portion of the nut and said nylon member.

25. Apparatus as in claim 1 wherein the means angulated at least in part includes conical adjustment means and means bearing on a conical portion thereof and on the transducer support member and said surface whereby said two force components are produced.

References Cited in the file of this patent

UNITED STATES PATENTS

| | | |
|---|---|---|
| 1,883,561 | Chipman | Oct. 18, 1932 |
| 2,343,440 | Andrus | Mar. 7, 1944 |
| 2,475,007 | Carlson | July 5, 1949 |
| 2,587,097 | Berlant | Feb. 26, 1952 |
| 2,596,839 | Clausen | May 13, 1952 |
| 2,644,856 | Pettus | July 7, 1953 |
| 2,668,879 | D'Arcy | Feb. 9, 1954 |
| 2,708,693 | Hendrickson | May 17, 1955 |
| 2,721,743 | Erikson et al. | Oct. 25, 1955 |
| 2,786,897 | Schwarz | Mar. 26, 1957 |